Nov. 19, 1935.  F. E. LEE ET AL  2,021,558
METHOD FOR RECOVERING SULPHUR DIOXIDE GAS IN A HIGHLY CONCENTRATED
FORM FROM MIXED GAS CONTAINING SULPHUR DIOXIDE
Filed March 10, 1933
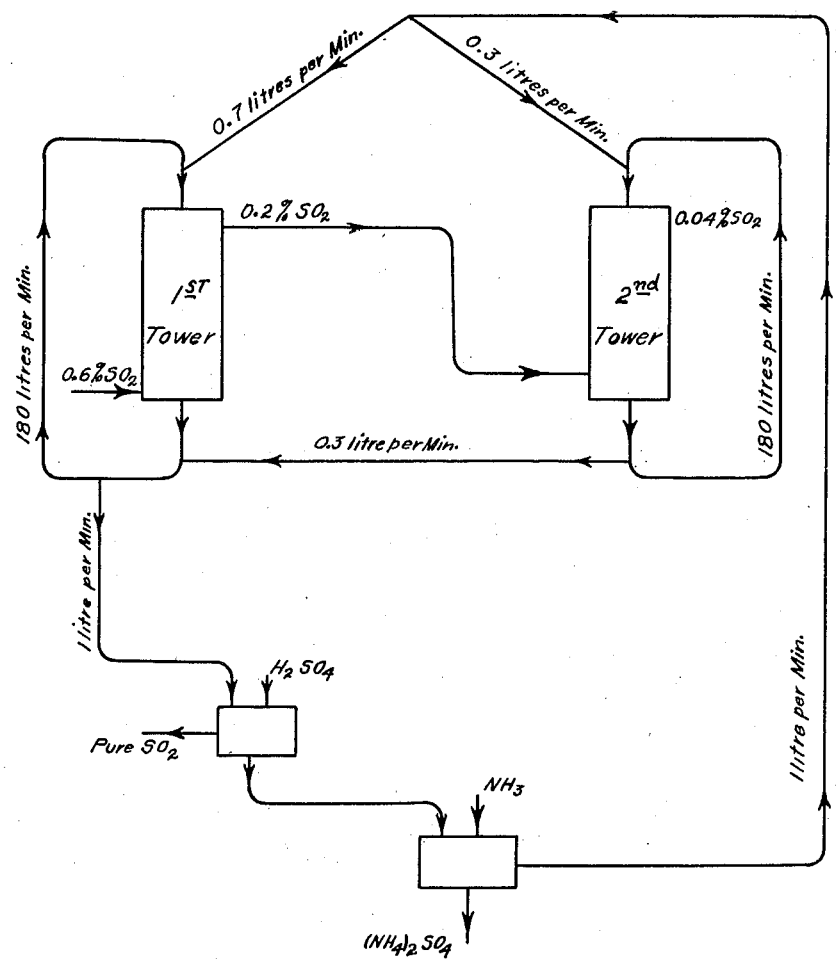

Patented Nov. 19, 1935

2,021,558

UNITED STATES PATENT OFFICE 2,021,558

METHOD FOR RECOVERING SULPHUR DIOXIDE GAS IN A HIGHLY CONCENTRATED FORM FROM MIXED GAS CONTAINING SULPHUR DIOXIDE

Frederick Eric Lee, Robert Lepsoe, and Francis Herbert Chapman, Trail, British Columbia, Canada, assignors to The Consolidated Mining and Smelting Company of Canada, Limited, Montreal, Quebec, Canada, a company of Canada Application March 10, 1933, Serial No. 660,290

4 Claims. (Cl. 23—178)

This invention relates to the separation and recovery of sulphur dioxide gas and solid crystalline ammonium sulphate by a continuous cyclic process from mixed gases containing sulphur dioxide gas by passing said gases into a solution of ammonium bisulphite to which is added an equivalent amount of ammonia and/or ammonium sulphite to form ammonium bisulphite with the sulphur dioxide, decomposing the bisulphite with sulphuric acid to recover pure sulphur dioxide, and separating and recovering ammonium sulphate in solid crystalline form by cooling and by adding anhydrous or gaseous ammonia to the solution, after which the ammoniacal solution after extraction of the excess ammonia, is returned to the absorption circuit.

We are aware that sulphur dioxide has been separated and recovered from gases containing sulphur dioxide by the absorption of the sulphur dioxide in solutions containing ammonium sulphites and by the addition of sulphuric acid to decompose the resulting solutions, whereby ammonium sulphate has been recovered as a salt.

Our process differs substantially from other known processes in that the absorption takes place in highly concentrated solutions substantially ammonium bisulphite, in one or more stages and at a controlled temperature, and the ammonium sulphate is separated from the solution substantially by the addition of anhydrous or gaseous ammonia, after decomposition with sulphuric acid.

We have found that the mutual absorption of sulphur dioxide gas in aqueous ammonia or of ammonia gas in aqueous sulphur dioxide is not quantitative, and in order to satisfy the requirements for sulphur dioxide absorption and at the same time to avoid a loss of ammonia, the conditions under which the absorption can be carried out efficiently have been found to be very restricted which restrictions increase with the dilution of the sulphur dioxide gas and necessitate a low operating temperature, one or more absorption steps with separately cyclic solutions substantially composed of highly concentrated ammonium bisulphite, the molecular proportion of bisulphite to monosulphite varying between 25 to 1 and 8 to 1, or giving a range of ratio of from 1 molecule of sulphur dioxide to 1.03 molecules of ammonia, to 1 molecule of sulphur dioxide to 1.1 molecules of ammonia.

We have found the effect of temperature and composition of solution on the absorption efficiency and ammonia loss is readily explained by the application of the law of mass action, and deductions based thereon show close agreement with actual observations. From the deductions shown in the following discussion it will be evident that a solution suitable to prevent the loss of ammonia would not be suitable for complete sulphur dioxide absorption and therefore it is necessary to obtain a maximum sulphur dioxide absorption with a minimum ammonia loss to scrub the gas with two or more solutions in two or more absorption towers.

Ammonium bisulphite dissociates in an aqueous solution into monosulphite and sulphur dioxide $$2NH_4HSO_3 \rightleftharpoons (NH_4)_2SO_3 + SO_2H_2O$$

and therefore this solution will have a vapor tension of sulphur dioxide, the magnitude of which is expressed by the fundamental equation:—

$$P_{SO_2} = K_1 \frac{C_1^2}{C_2}$$

where $C_1$ and $C_2$ are the concentrations respectively of the bisulphite and monosulphite.

Likewise ammonium monosulphite dissociates due to hydrolysis and the solution will have a vapor tension of ammonia expressed in the fundamental equation:—

$$P_{NH_3} = K_2 \frac{C_2^2}{C_1}$$

Hence solutions of ammonium sulphites have vapor tensions of both ammonia and sulphur dioxide, each expressed by a square order function of the concentration, and the necessity of a multistage absorption in order to maintain a maximum sulphur dioxide absorption with a minimum ammonia loss is thus evident. As an illustration, in a multiple stage absorption process, in the first absorption tower the sulphur dioxide gas is scrubbed with a highly concentrated solution containing 9 moles per litre bisulphite (say 900 gms./litre) and 0.5 mole per litre monosulphite (say 60 gms./litre) that is, the mole proportion bisulphite to monosulphite is 18 to 1. Operating at 20° C., the gas leaving this tower will theoretically contain 0.4% sulphur dioxide and 0.0004% ammonia by volume. By maintaining the same mole proportion in the second tower, but only $\frac{1}{10}$ of the total strength, the ammonia and sulphur dioxide vapor tensions are reduced to one tenth; in other words, the gas leaving the second tower will contain 0.04% sulphur dioxide and 0.0004% ammonia. It may not always be practicable to use such weak solution in the second tower. We may for instance use a solution containing 4 moles per litre bisulphite (400 gms./litre) and 0.5 mole per litre monosulphite (60 gms./litre). The mole proportion of bisulphite to monosulphite is 8 to 1 and the gas leaving the second tower will contain 0.0009% ammonia and 0.08% sulphur dioxide. If the original sulphur dioxide gas contained 0.6% sulphur dioxide, the recovery of sulphur dioxide is thus theoretically 87% and the loss of ammonia expressed as percentage of ammonia used for absorption, is 0.2%.

We have accurately determined the temperature coefficient for $K_1$ and $K_2$ both of which are found to follow the fundamental law $$\frac{dR\ln K}{d(1/T)} = -\Delta H$$

When the symbols R=the gas constant, numerically equal to 2, or more correctly 1.98 for 1 gram molecule.

K=the equilibrium constant $K_1$ or $K_2$.

T=the absolute temperature, i. e. the temperature centigrade +273.

$-\Delta H$=the heat absorbed in the reaction, evaporation or dissociation of one gram molecule of the substance.

$\Delta H$ for $K_1$=7,500 cal.=incidentally the latent heat of vaporization of sulphur dioxide.

$\Delta H$ for $K_2$=22,000 cal.=the latent heat of vaporization of $NH_3$ plus the heat of hydrolysis.

As the vapor tension of both ammonia and sulphur dioxide increase rapidly with an increase of temperature, we prefer to maintain the temperature in the absorption towers between 10° C. and 50° C. The presence of ammonia even in very small amounts in the gas leaving the absorption tower manifests itself as a white fume, especially with increasing temperatures, and with higher proportions of monosulphite the amount of fume increases tremendously. The ammonium sulphite fumes are not readily wetted and therefore cannot be conveniently separated except by electrostatic or bag house treatment.

The absorption of sulphur dioxide in a solution comprising substantially a highly concentrated ammonium bisulphite may take place in one or more packed absorption towers or other suitable apparatus. For example, if two towers are used the sulphur dioxide containing gas enters at the bottom of tower 1, discharges at the top, enters at the bottom of tower 2 and finally discharges at the top of the second tower practically free from sulphur dioxide and ammonia. Each tower has its separate solution circuit. A comparatively small amount of the solution, corresponding to the amount of solution required for the sulphur dioxide absorbed, is continuously withdrawn from the first tower, sulphuric acid is added to the withdrawn solution and pure sulphur dioxide gas is liberated and recovered; this solution, now consisting substantially of ammonium sulphate, is withdrawn from the acidifying apparatus and if any crystals of ammonium sulphate have been formed, they are separated from the solution and recovered; the solution is then treated with anhydrous or gaseous ammonia causing precipitation of ammonium sulphate in crystalline form. The resultant solution, after the excess of ammonia over that required for absorption of sulphur dioxide has been extracted, is returned to the absorption tower circuits and thus replaces the solution which was withdrawn for acidification. The solution withdrawn from the second tower may go either to the first tower circuit or direct to the acidifier. By keeping a comparatively large volume of solution in circuit and continuously withdrawing an amount corresponding to the amount of solution required for the sulphur dioxide absorbed, it is possible to keep the composition of the absorbing solution constant and no crystallization takes place in the towers. The sulphur dioxide in the incoming gas forms ammonium bisulphite with the monosulphite present in the solution. Ammonia is added to the solution to form fresh monosulphite and thus restore the equilibrium.

Whether the process is operated as a one stage or multiple stage absorption process is largely a question of economics and a question of what percentage of sulphur dioxide gas is to be saved. With a gas containing a concentration of sulphur dioxide such that the loss of sulphur dioxide resulting from the one stage absorption process would be of a percentage high enough to warrant the use of a multiple stage process, the multiple stage process would be used. If, however, the concentration of sulphur dioxide in the gas is such that the loss of sulphur dioxide does not warrant the use of a multiple stage process, then the one stage absorption process would be used.

As an illustration, it has been found that by using a solution containing about 500 grams per litre ammonium bisulphite a one stage absorption process could be applied to a gas containing sulphur dioxide concentration as low as 0.6% and at the same time maintaining the temperature between 10° C. and 50° C. thus preventing an excessive loss of ammonia, and that while there is a slightly higher loss of sulphur dioxide, the balance of economics is in favor of the one stage absorption process.

Having thus fully described our invention what we claim as new and desire to secure by Letters Patent is:

1. A cyclic process for the treatment of mixed gases containing sulphur dioxide for the recovery therefrom of pure sulphur dioxide gas and for the production of crystalline ammonium sulphate, comprising the steps of combining, at a controlled temperature in one or more absorption stages, the sulphur dioxide with ammonium monosulphite, obtained from the combination of aqueous ammonia with ammonium bisulphite solution, to form ammonium bisulphite, whereby in the first stage both combinations take place in a highly concentrated solution of substantially ammonium bisulphite in which the molecular proportion of ammonium monosulphite to ammonium bisulphite is within the range of from 1 to 25 to 1 to 18, and in the second stage both combinations take place in a somewhat lesser concentration of substantially ammonium bisulphite in which the molecular proportion of ammonium monosulphite to ammonium bisulphite is within the range of from 1 to 18 to 1 to 8, the concentration of substantially ammonium bisulphite solution here depending upon the permissible loss of sulphur dioxide in the exit gas, withdrawing part of one or both of said solutions and decomposing it or them by the addition of sulphuric acid to form pure sulphur dioxide gas and a solution of ammonium sulphate, precipitating ammonium sulphate in crystalline form from the ammonium sulphate solution by the addition of anhydrous or gaseous ammonia, extracting the excess ammonia from the resultant solution and returning said solution to the absorption circuit for the formation of ammonium monosulphite.

2. A cyclic process for the treatment of mixed gases containing sulphur dioxide for the recovery therefrom of pure sulphur dioxide gas and for the production of crystalline ammonium sulphate, which comprises the steps of combining at a controlled temperature in one or more absorption stages the sulphur dioxide with ammonium monosulphite, obtained from the combination of aqueous ammonia with ammonium bisulphite solution, to form ammonium bisulphite, whereby in the first stage both combinations take place in a highly concentrated solution of substantially ammonium bisulphite in which the molecular proportion of ammonium monosulphite to ammonium bisulphite is within the range of from 1 to 25 to 1 to 18 and in the second stage both combinations take place in a somewhat lesser concentration of substantially ammonium bisulphite in which the molecular proportion of ammonium monosulphite to ammonium bisulphite is within the range of from 1 to 18 to 1 to 8, the concentration of substantially ammonium bisulphite solution here depending on the permissible loss of sulphur dioxide in the exit gas, controlling the temperature in the absorption stages between 10° C. and 50° C. thereby maintaining a low vapor tension of sulphur dioxide and of ammonia, thus obtaining a maximum absorption of sulphur dioxide gas, withdrawing part of one or both of said solutions and decomposing it or them by the addition of sulphuric acid to form pure sulphur dioxide gas and a solution of ammonium sulphate, precipitating ammonium sulphate in crystalline form from the ammonium sulphate solution by the addition of anhydrous or gaseous ammonia, extracting the excess ammonia from the resultant solution and returning the said solution to the absorption circuit for the formation of ammonium monosulphite.

3. A cyclic process for the treatment of gas containing sulphur dioxide for the recovery therefrom of sulphur dioxide and for the production of crystalline ammonium sulphate which comprises treating a gas containing as low as 0.5% sulphur dioxide in a one stage absorption process by combining the sulphur dioxide with ammonium monosulphite, obtained from the combination of aqueous ammonia with ammonium bisulphite solution, to form ammonium bisulphite, whereby the combination takes place in a solution of substantially ammonium bisulphite in which the molecular proportion of ammonium monosulphite to ammonium bisulphite is maintained within the range of from 1 to 25 to 1 to 18 while maintaining the temperature at which the absorption is effected within the range of from 10° C. to 30° C., withdrawing part of said solution and decomposing it by the addition of sulphuric acid to form pure sulphur dioxide gas and a solution of ammonium sulphate; precipitating ammonium sulphate in crystalline form from the ammonium sulphate solution by the addition of anhydrous or gaseous ammonia; extracting the excess ammonia from the resultant solution and returning said solution to the absorption circuit for the formation of ammonium monosulphite.

4. A cyclic process for the treatment of gas containing sulphur dioxide for the recovery therefrom of pure sulphur dioxide and for the production of crystalline ammonium sulphate which comprises treating a gas containing as low as 0.5% sulphur dioxide in a one stage absorption process by combining the sulphur dioxide with ammonium monosulphite, obtained from the combination of aqueous ammonia with ammonium bisulphite solution, to form ammonium bisulphite whereby the combinations take place in a solution of substantially ammonium bisulphite in which the molecular proportion of ammonium monosulphite to ammonium bisulphite is maintained within the range of from 1 to 18 to 1 to 8 while maintaining the temperature at which the absorption is effected within the range of from 10° C. to 40° C.; withdrawing part of said solution and decomposing it by the addition of sulphuric acid to form pure sulphur dioxide and a solution of ammonium sulphate; precipitating ammonium sulphate in crystalline form from the ammonium sulphate solution by the addition of anhydrous or gaseous ammonia; extracting the excess ammonia from the resultant solution and returning said solution to the absorption circuit for the formation of ammonium monosulphite.

FREDERICK ERIC LEE.
ROBERT LEPSOE.
FRANCIS HERBERT CHAPMAN.